United States Patent [19]

Reimus et al.

[11] 3,783,632
[45] Jan. 8, 1974

[54] ICE WASH APPARATUS

[76] Inventors: Richard G. Reimus, c/o P.O. Box 1500, Brandon, Manitoba, Canada; Anthony Saporito, 11 Parker St., Warren, Pa. 16365

[22] Filed: May 19, 1971

[21] Appl. No.: 145,051

Related U.S. Application Data

[60] Continuation of Ser. No. 889,231, Dec. 30, 1967, abandoned, which is a division of Ser. No. 763,058, Sept. 27, 1968, which is a division of Ser. No. 718,510, April 3, 1968, Pat. No. 3,432,308, which is a division of Ser. No. 511,173, , Pat. No. 3,381,302.

[52] U.S. Cl. .................... 62/123, 99/152, 99/199 C
[51] Int. Cl. ........................... A23f 1/06, B01d 9/04
[58] Field of Search ................... 62/123, 58; 99/152, 99/199 C, 236 C, 236 T; 34/5, 92

[56] References Cited
UNITED STATES PATENTS

| | | | |
|---|---|---|---|
| 3,283,522 | 11/1966 | Ganiaris | 62/58 |
| 3,347,058 | 10/1967 | Svanoe | 62/58 |
| 3,224,880 | 12/1965 | Van Ike | 99/71 |
| 3,283,522 | 11/1966 | Ganiaris | 62/123 X |
| 3,347,058 | 10/1967 | Svanoe | 62/123 X |
| 3,082,211 | 3/1963 | Green | 99/77 X |
| 3,495,522 | 2/1970 | Mullen | 34/92 X |

FOREIGN PATENTS OR APPLICATIONS 529,202 11/1940 Great Britain .......................... 79/71

*Primary Examiner*—William E. Wayner
*Attorney*—William A. Drucker

[57] ABSTRACT

A system of apparatus for removing water from coffee and tea extract by first chilling to form a suspension of solids in the liquid is provided which forms a mixture of ice and liquid. The ice is separated in a centrifuge and is washed.

6 Claims, 1 Drawing Figure

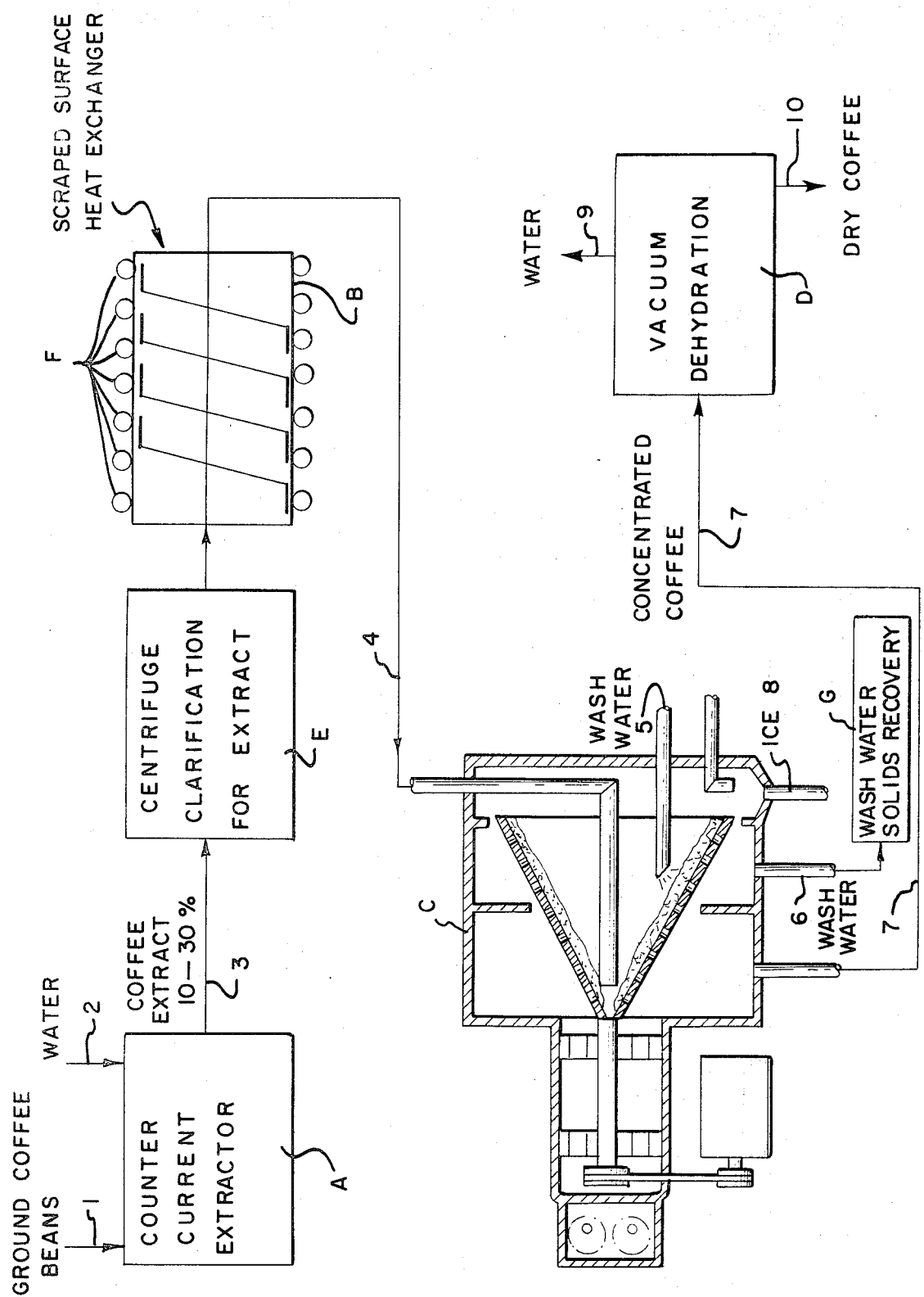

ICE WASH APPARATUS

This application is a continuation of Ser. No. 889,231 filed 12/30/67, now abandoned, which is a division of copending application Ser. No. 763,058 filed Sept. 27, 1968 which is a division of Ser. No. 718,510 filed Apr. 3, 1968, now Pat. No. 3,432,308 issued Mar. 11, 1969, which is a division of Ser. No. 511,173, now Pat. No. 3,381,302 issued Apr. 30, 1968.

This invention relates to apparatus for the preparation of concentrated comestible liquids and liquid extracts and is particularly applicable to equipment for making soluble tea and coffee solids or "powdered coffee." More particularly, this invention relates to systems of equipment for use in the removal of ice from the extract by a freezing process.

Soluble, or powdered coffee has been prepared by first extracting coffee beans with hot water and subsequently dehydrating the extract by spray drying under vacuum conditions. This process has met with vast commercial success, but the flavour of the soluble coffee leaves much to be desired. The vacuum conditions employed not only remove water from the extract, but also cause volatile taste and flavour elements of the coffee to evaporate. The resulting soluble product is, therefore, never as good as the extract from which it is prepared.

To improve the flavour of the soluble coffee, it has been often proposed to remove substantial amounts of water in the extract by partially freezing the extract and separating the resulting pure ice crystals from the concentrated extract. This process of partial freezing is then followed by a complete dehydration by evaporation of water which may be conducted under vacuum conditions. In this way, the coffee loses less of the volatile components by virtue of the fact that the extract is subject to evaporation conditions for shorter periods of time.

In a preferred embodiment of the freezing process, the coffee extract is partially frozen by indirect refrigeration in a suitable crystallizer and the resulting slurry of ice and concentrate is subjected to centrifugation to separate the ice from the concentrate. In order for the process to be economical, this separation and the subsequent water wash of the crystals on the centrifuge basket must effect a relatively complete removal of mother liquor from the ice crystals.

According to this invention an apparatus for concentration of comestible liquids comprising a freeze concentration device and ice washing means are connected together in that order to form a system.

The initial steps in the process of preparing instant coffee are the same as preparing regular coffee. Following roasting, the coffee is ground, but the granulation may be extremely coarse and, in some cases, fine particles that may result from grinding are sieved out and used elsewhere.

The grounds are placed in closed containers known as extractors. These extractors are set up in batteries with several extractors to a battery.

Ground coffee and hot water are charged into the first extractor. The coffee is then extracted until the necessary materials have been removed from the grounds. The resulting extract is then charged in the second extractor containing fresh coffee. The second extractor is run until extraction is completed. The resulting coffee extract (which is now stronger than ordinary coffee beverage) is placed in the third extractor containing fresh grounds and the brewing process is again repeated.

In commercial plant operation, the process is conducted in a semi-continuous manner, the fresh water coming into an extraction battery first reaches the extractor having the most spent, exhausted grounds and proceeds from there to the next most spent grounds and so on until, finally, in the last extractor it reaches the fresh, most recently added grounds. This is known as a counter-current extraction system.

Temperature and pressure in the extractor system will vary greatly. Coffee being produced from fresh grounds is usually processed at low temperature with low pressure. Coffee being produced from spent, exhausted grounds is extracted at high temperature and under high pressure.

In prior art processes, after leaving the extractor system, the coffee extract is clarified of sediment while still at an elevated temperature. One of the most common methods of clarification is by means of a centrifuge in which the coffee liquid is passed through a rapidly rotating cylinder and discharges the clear liquid. Another method is by means of a pressure pump forcing the concentrate through porous paper or cloth.

After being freed from the precipitate, the resulting precipitate-free coffee extract is then subjected to concentration by partial freezing of the water therefrom. This freeze concentration process can be conducted in batch, semi-continuous or continuous apparatus according to methods known to the art and improvements of the methods. However, any method of removing the water from the coffee extract by crystallization as ice is applicable to the process of this invention. The resulting slurry of ice and concentrated coffee extract is then subjected to centrifugation to free the concentrated solution of the ice crystals. The resulting ice crystals are washed with water or dilute coffee extract to free the ice crystals completely of residual mother liquor and the washings may be returned to the freeze concentration process.

The freeze concentration of the comestible liquid or extract can be accomplished in either a single stage or in a plurality of stages, each of which comprises a crystallizer in which heat is removed from the coffee extract to form a slurry of ice crystals and concentrated mother liquor. After each crystallization stage, ice is removed from the slurry and the concentrated extract either goes to further processing in the preparation of soluble or powdered coffee or is further concentrated in a subsequent stage of the freeze concentration process. The crystallization of ice from the extract is preferably carried out in a tubular heat exchanger, the outside surfaces of which are cooled by a circulation refrigerant. The internal section of the tube is ordinarily fitted with a shaft on which is located agitator paddles. Alternatively, a conventional scraped surface tubular heat exchanger may be employed. Any acceptable separating device or centrifuge may be employed for separating the concentrated coffee extract from the resulting ice crystals. This centrifuge is the preferred method for separating ice from the mother liquor and ordinarily consists of a rotating basket which contains perforations for allowing passage of the mother liquor. The centrifuge may be equipped with means for washing residual mother liquor from the ice crystals.

Referring now to the accompanying drawing, a counter current extractor A is connected to a centrifuge clarifier for the extract E, which is then connected to a scraped surface heat exchanger B having cooling coils F therearound. The heat exchanger B is connected to an ice washing centrifuge C, the wash water of which is sent to a wash water solids recovery G of the type described. The centrifuge is also connected to a vacuum dehydrator D. Ground coffee beans 1 enter the extractor A along with water 2 to provide a 10–30 percent coffee extract at line 3. This extract is clarified in clarifier E and is then conveyed to heat exchanger or crystallizer B. A slurry of ice in more concentrated extract is conveyed along line 4 to ice washing centrifuge C. Wash water enters the centrifuge at line 5 and leaves at line 6 where it passes to a wash water solids recovery means G. The washed ice leaves the centrifuge at line 8 and the concentrated liquid coffee extract is conveyed in line 7 to the vacuum dehydration means D wherefrom water is removed in line 9 and dry coffee is delivered from line 10 in particulate or powdered form.

We claim:

1. An apparatus system for concentration of aqueous liquid coffee extract comprising: extract forming means, a tubular ice crystallizer, means conducting extract from said extract forming means to said tubular ice crystallizer, a basket centrifuge ice separator, a line conducting a slurry of ice in liquid extract from said crystallizer to said centrifuge and means introducing wash water into said centrifuge basket for washing ice thereon, a line removing washed ice from said centrifuge, a vacuum dehydrator means, a line conveying extract from said centrifuge to said dehydrator means and a line removing extract product from said dehydrator means.

2. A system according to claim 1 in which the tubular ice crystallizer is a scraped surface crystallizer.

3. A system according to claim 1 including centrifuge clarification means between the extract forming means and the tubular ice crystallizer.

4. A system according to claim 1 in which the outside surfaces of the tubular crystallizer are cooled by a circulating refrigerant for indirect cooling of coffee within the crystallizer.

5. A system according to claim 1 including means recovering dissolved coffee from the wash water after the wash water leaves the centrifuge.

6. A system according to claim 1 wherein said extract forming means comprise counter current extraction means for ground coffee.

* * * * *